(12) United States Patent
Masumoto

(10) Patent No.: US 9,415,670 B2
(45) Date of Patent: Aug. 16, 2016

(54) WEATHERSTRIP

(71) Applicant: Nishikawa Rubber Co., Ltd., Hiroshima (JP)

(72) Inventor: Atsuo Masumoto, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 82 days.

(21) Appl. No.: 14/479,975

(22) Filed: Sep. 8, 2014

(65) Prior Publication Data

US 2015/0076856 A1 Mar. 19, 2015

(30) Foreign Application Priority Data

Sep. 19, 2013 (JP) ................................. 2013-194557

(51) Int. Cl.
*B60J 10/20* (2016.01)
*B60J 10/00* (2016.01)

(52) U.S. Cl.
CPC ................ *B60J 10/006* (2013.01); *B60J 10/16* (2016.02); *B60J 10/24* (2016.02); *B60J 10/277* (2016.02); *B60J 10/32* (2016.02); *B60J 10/82* (2016.02)

(58) Field of Classification Search
CPC ............... B60J 10/0005; B60J 10/0014; B60J 10/0031; B60J 10/0045; B60J 10/006; B60J 10/0065; B60J 10/0088; B60J 10/10; B60J 10/12; B60J 10/14; B60J 10/16; B60J 10/20; B60J 10/24; B60J 10/25; B60J 10/27; B60J 10/277; B60J 10/32; B60J 10/82; B60J 10/90
See application file for complete search history.

(56) References Cited

U.S. PATENT DOCUMENTS

| 4,381,115 | A | * | 4/1983 | Ko | ........................ B60J 10/0031 277/641 |
| 4,617,220 | A | * | 10/1986 | Ginster | ................ B60J 10/0005 428/122 |
| 5,158,335 | A | * | 10/1992 | Usuta | ........................ B60J 10/12 296/146.9 |
| 5,269,582 | A | * | 12/1993 | Muller | ..................... B60J 10/10 296/116 |
| 5,307,591 | A | * | 5/1994 | Usuta | .................... B60J 10/0005 49/475.1 |
| 5,669,656 | A | * | 9/1997 | Aydt | ........................ B60J 10/10 296/116 |
| 5,860,692 | A | * | 1/1999 | Nozaki | ................ B60J 10/0005 296/146.9 |
| 5,950,366 | A | * | 9/1999 | Uhlmeyer | ............ B60J 10/0005 296/213 |

(Continued)

FOREIGN PATENT DOCUMENTS

| DE | 3016237 A1 * 10/1981 | .............. B60R 13/06 |
| DE | EP 0065336 A1 * 5/1982 | ................. B60J 1/17 |

(Continued)

OTHER PUBLICATIONS

European Patent Office, Extended European Search Report for Application No. 14184031.4, Mar. 9, 2015, 6 pages, Germany.

*Primary Examiner* — Glenn Dayoan
*Assistant Examiner* — Paul Chenevert
(74) *Attorney, Agent, or Firm* — Alston & Bird LLP

(57) ABSTRACT

A weatherstrip includes an attachment portion, a flexible seal wall, a flexible bridging wall, and a hollow portion. The seal wall extends from an upper portion of the attachment portion toward the front of a vehicle, is turned up, and extends toward the rear of the vehicle. A lower surface of a peripheral portion of a roof panel toward the rear of the vehicle and a lower surface of a peripheral portion of a rear door panel toward the front of the vehicle contact the seal wall from above. The bridging wall bridges the seal wall and the attachment portion. The hollow portion is surrounded by the attachment portion, the seal wall, and the bridging wall.

5 Claims, 14 Drawing Sheets

(56) References Cited

U.S. PATENT DOCUMENTS

| | | | | |
|---|---|---|---|---|
| 6,213,536 | B1* | 4/2001 | Raisch | B60J 10/0011 296/107.04 |
| 6,270,154 | B1* | 8/2001 | Farber | B60J 7/047 296/213 |
| 6,364,407 | B1* | 4/2002 | Raisch | B60J 10/10 296/216.06 |
| 6,685,252 | B2* | 2/2004 | Graf | B60J 10/0045 296/108 |
| 6,848,218 | B2* | 2/2005 | Langemann | B60J 10/0011 296/146.9 |
| 7,651,159 | B2* | 1/2010 | Radmanic | B60J 10/0042 296/213 |
| 7,669,370 | B2* | 3/2010 | Oba | B60J 10/0005 49/475.1 |
| 8,402,696 | B2* | 3/2013 | Iwasa | B60J 10/0005 296/146.9 |
| 8,840,170 | B2* | 9/2014 | Zimmer | B60J 10/0031 296/1.08 |
| 8,857,888 | B2* | 10/2014 | Ugolini | B60J 7/146 280/756 |
| 2002/0036414 | A1* | 3/2002 | Nozaki | B60J 10/24 296/146.9 |
| 2003/0122400 | A1* | 7/2003 | Berglund | B60R 13/04 296/146.9 |
| 2004/0182010 | A1* | 9/2004 | Kalb | B60J 10/042 49/441 |
| 2005/0001458 | A1 | 1/2005 | Yamada | |
| 2007/0069553 | A1 | 3/2007 | Yamada et al. | |
| 2008/0238137 | A1* | 10/2008 | Kobayashi | B60J 10/248 296/146.9 |
| 2008/0265616 | A1* | 10/2008 | Kubo | B25B 31/00 296/146.9 |
| 2015/0028630 | A1* | 1/2015 | Grimm | B60J 7/0015 296/213 |
| 2015/0246605 | A1* | 9/2015 | Kleinhoffer | B60J 10/24 296/216.06 |
| 2015/0273993 | A1* | 10/2015 | Sobue | B60J 10/081 296/146.9 |

FOREIGN PATENT DOCUMENTS

| | | | | |
|---|---|---|---|---|
| DE | 3103535 | A1 * | 9/1982 | E06B 3/42 |
| DE | 19702336 | A1 * | 7/1998 | B60J 10/0042 |
| DE | 10350675 | A1 * | 6/2005 | B60J 10/0031 |
| DE | 102004017328 | A1 * | 12/2005 | B60J 7/0084 |
| DE | 102005060976 | A1 | 6/2007 | |
| DE | 102012101694 | A1 * | 9/2013 | B60J 10/12 |
| FR | 2486463 | A1 * | 1/1982 | B60J 10/12 |
| JP | 7-84162 | * | 9/1995 | B60R 13/06 |
| JP | 2010-260393 | A | 11/2010 | |

* cited by examiner

WEATHERSTRIP

CROSS-REFERENCE TO RELATED APPLICATION

This application claims priority to Japanese Patent Application No. 2013-194557 filed on Sep. 19, 2013, the entire disclosure of which is incorporated by reference herein.

BACKGROUND

The present disclosure relates to weatherstrips each sealing a clearance between a peripheral portion of a roof panel covering an opening in an upper portion of a vehicle and a portion of the vehicle around the opening in the upper portion of the vehicle.

Conventionally, roof panels each opening or closing an opening in an upper portion of a vehicle as described in, for example, Japanese Unexamined Patent Publication No. 2010-260393 have been known. A clearance between a peripheral portion of such a roof panel and a portion of a vehicle around an opening in an upper portion of a vehicle is sealed with a roof weatherstrip.

The weatherstrip includes an attachment portion and a flexible seal wall. The attachment portion is attached to a frame toward the interior of a cabin, and extends along the clearance in a generally horizontal direction. The seal wall is continuous with an upper part of the attachment portion, and has a generally U-shaped cross section. The seal wall and the attachment portion define a hollow portion. A lower surface of the peripheral portion of the roof panel and a lower surface of the portion of the vehicle around the opening in the upper portion of the vehicle contact the seal wall from above.

In recent years, vehicles configured such that such a roof panel as described above can be replaced with another roof panel of a different type (material) to meet the driver's or passenger's preferences have been known. Replaceable roof panels for such a vehicle are of different types (materials), and are thus designed to have different thicknesses to ensure the rigidity required when such replaceable roof panels each have been attached to the vehicle. To allow the vehicle to have an aesthetically pleasing appearance, an upper surface of a roof panel and an upper surface of a portion of the vehicle around an opening in an upper portion of the vehicle are typically designed to be generally flush with each other. For this reason, variations in roof panel thickness may cause a lower surface of a peripheral portion of the roof panel to be significantly below a lower surface of the portion of the vehicle around the opening in the upper portion of the vehicle.

SUMMARY

Unfortunately, in such a weatherstrip as described in Japanese Unexamined Patent Publication No. 2010-260393, when a portion of the weatherstrip near a peripheral portion of a roof panel is pressed from above, a portion of the weatherstrip near a portion of a vehicle around an opening in an upper portion of the vehicle is also displaced downwardly (bent) by an amount equivalent to the amount by which the portion thereof near the peripheral portion of the roof panel is displaced downwardly. For this reason, if, when the roof panel has been replaced with another roof panel of a different type, a change in roof panel thickness causes a lower surface of the peripheral portion of the roof panel to be significantly below a lower surface of the portion of the vehicle around the opening in the upper portion of the vehicle, the lower surface of the portion of the vehicle around the opening in the upper portion of the vehicle may not contact the weatherstrip, and water may enter a cabin through the clearance between the lower surface and the weatherstrip.

It is therefore an object of the present disclosure to provide a weatherstrip that can ensure that even when a roof panel covering an opening in an upper portion of a vehicle is replaced with another roof panel of a different type, water is prevented from entering a cabin.

To achieve the object, the present disclosure shows a configuration in which even when a portion of a roof weatherstrip near a peripheral portion of a roof panel is pressed from above, a portion of the weatherstrip near a portion of a vehicle around an opening in an upper portion of the vehicle is prevented from being displaced downwardly (bent) by an amount equivalent to the amount by which a portion of the weatherstrip near the peripheral portion of the roof panel is displaced downwardly.

Specifically, the present disclosure is directed toward a weatherstrip sealing a clearance between a peripheral portion of a replaceable roof panel covering an opening in an upper portion of a vehicle and a portion of the vehicle around the opening in the upper portion of the vehicle, and includes the following solutions.

Specifically, a weatherstrip according to a first aspect of the disclosure includes: an attachment portion attached to a vehicle body; a lip-like flexible seal wall having a generally J-shaped cross section, extending from an upper portion of the attachment portion toward an interior of a cabin, then turned up, and extending outwardly of the cabin, a lower surface of the peripheral portion of the roof panel and a lower surface of the portion of the vehicle around the opening in the upper portion of the vehicle contacting the lip-like flexible seal wall from above; a flexible bridging wall bridging the attachment portion and a portion of the seal wall corresponding to the clearance or the portion of the vehicle around the opening in the upper portion of the vehicle; and a hollow portion surrounded by the attachment portion, the seal wall, and the bridging wall.

According to a second aspect of the disclosure, in the first aspect of the disclosure, a root portion of the seal wall connected to the attachment portion may be made of a material having greater rigidity than the bridging wall and a portion of the seal wall except the root portion.

According to a third aspect of the disclosure, in the second aspect of the disclosure, the root portion and the attachment portion may be made of an identical material, and are continuous.

According to a fourth aspect of the disclosure, in the first aspect of the disclosure, a root portion of the seal wall connected to the attachment portion may include a flexible lip portion extending toward the interior of the cabin and having a lower surface contacting the vehicle body from above.

According to a fifth aspect of the disclosure, in the first aspect of the disclosure, an inner surface of a portion of the seal wall toward the interior of the cabin may have a recess.

According to a sixth aspect of the disclosure, in the first aspect of the disclosure, the portion of the vehicle around the opening in the upper portion of the vehicle may be a peripheral portion of a rear door panel toward a front of the vehicle, and the rear door panel may cover an opening in a rear portion of the vehicle such that the opening can be opened or closed.

In the first aspect of the disclosure, when the seal wall is pressed from above, the seal wall and the bridging wall are bent downwardly. This allows the bridging wall to apply an upward pressure to a portion of the seal wall near the portion of the vehicle around the opening in the upper portion of the vehicle. For this reason, when, in the same manner as in the case in which the roof panel has been replaced with a thicker roof panel, the lower surface of the peripheral portion of the roof panel is below the lower surface of the portion of the vehicle around the opening in the upper portion of the vehicle, and a portion of the seal wall near the peripheral portion of the roof panel is pressed more downwardly than a portion of the seal wall near the portion of the vehicle around the opening in the upper portion of the vehicle, the upward pressure is applied from the bridging wall to the portion of the seal wall near the portion of the vehicle around the opening in the upper portion of the vehicle to allow the seal wall to press against the lower surface of the portion of the vehicle around the opening in the upper portion of the vehicle. This can prevent a clearance from being formed between the lower surface of the portion of the vehicle around the opening in the upper portion of the vehicle and the seal wall.

In the second aspect of the disclosure, the root portion of the seal wall connected to the attachment portion is less likely to be bent than the portion of the seal wall except the root portion. For this reason, when the seal wall seals the clearance between the peripheral portion of the roof panel and the portion of the vehicle around the opening in the upper portion of the vehicle, the phenomenon where the root portion is bent downwardly of the seal wall toward the interior of the cabin (the phenomenon called "inclination") is prevented even in a situation where the pressure is applied to the seal wall toward the interior of the cabin. This prevention prevents the seal wall from being displaced from the location corresponding to the clearance between the peripheral portion of the roof panel and the portion of the vehicle around the opening in the upper portion of the vehicle toward the interior of the vehicle, and can ensure the sealing of the clearance.

In the third aspect of the disclosure, the root portion is less likely to be bent toward the interior of the cabin with respect to the attachment portion. This makes it more difficult for the seal wall to be bent further downward toward the interior of the cabin than in the second aspect of the disclosure even with the pressure applied to the seal wall toward the interior of the cabin. This can ensure that the seal wall is prevented from being displaced from the location corresponding to the clearance between the peripheral portion of the roof panel and the portion of the vehicle around the opening in the upper portion of the vehicle toward the interior of the cabin, and can improve the sealing performance at which the clearance is sealed.

In the fourth aspect of the disclosure, the lip portion supports the seal wall from the interior of the cabin even with the pressure applied to the seal wall toward the interior of the cabin. This makes it difficult for the seal wall to be bent toward the interior of the cabin. Thus, when the seal wall seals the clearance between the peripheral portion of the roof panel and the portion of the vehicle around the opening in the upper portion of the vehicle, the seal wall is not bent downwardly toward the interior of the cabin, and the clearance can continue being sealed at high sealing performance.

In the fifth aspect of the disclosure, a portion of the seal wall including the recess is thinner than the other portions thereof, and for this reason, when the pressure is applied to the seal wall from above, this pressure ensures that the portion of the seal wall including the recess is bent. This makes it difficult for the shape of the bent seal wall to vary even with the changing of the roof panel to another roof panel of a different type, and can reduce variations in sealing performance at which the clearance between the peripheral portion of the replaceable roof panel of the vehicle and the portion of the vehicle around the opening in the upper portion of the vehicle is sealed.

In the sixth aspect of the disclosure, in the vehicle including the replaceable roof panel, when the rear door panel is opened, the lower surface of the rear door panel does not contact the seal wall of the weatherstrip. Since the bridging wall, therefore, applies an upward pressure to a portion of the seal wall near the rear door panel, this allows a portion of the seal wall near the rear door panel to have a portion that is inclined such that with decreasing distance to the outer end of the seal wall, the height of the seal wall increases. This prevents water flowing through the upper surface of the roof panel toward the rear of the vehicle from moving backward of the inclined portion of the seal wall, and can ensure that water is prevented from entering the cabin through the opening in the rear portion of the vehicle when the rear door panel is opened.

DETAILED DESCRIPTION

Embodiments of the present disclosure will now be described with reference to the drawings. The following embodiments are merely preferred examples in nature.

First Embodiment of the Disclosure

Figure 1A:
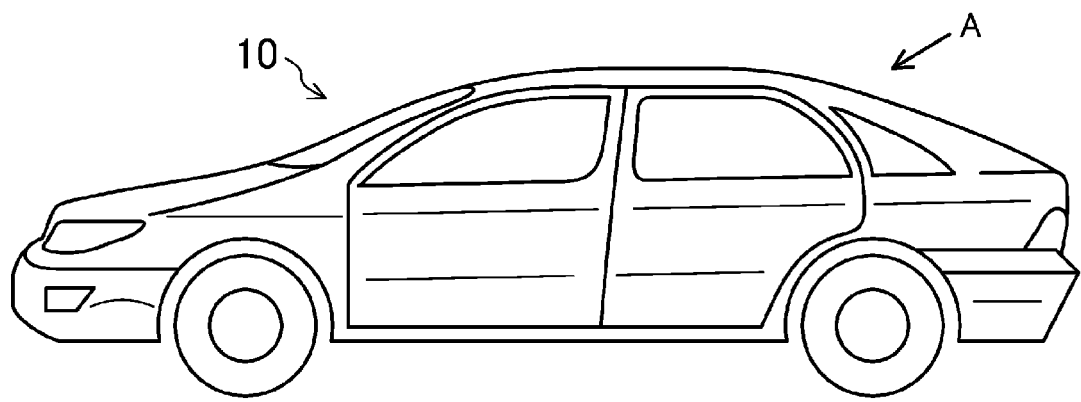
FIG. 1A is a side view of a vehicle including a weatherstrip according to a first embodiment of the present disclosure.
Figure 1B:
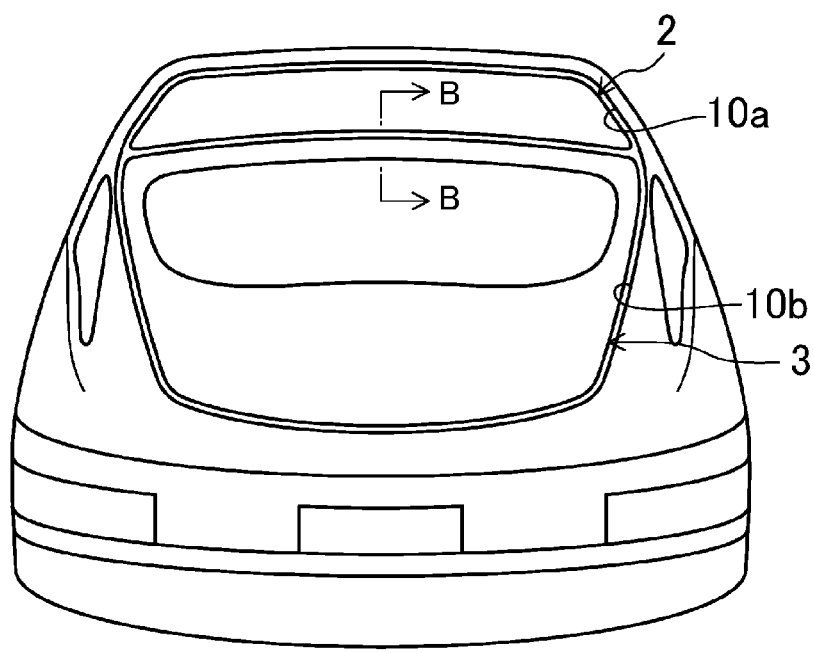
FIG. 1B is a view of the vehicle as viewed in the direction of the arrow A in FIG. 1A.

FIGS. 1A and 1B illustrate a vehicle 10 according to a first embodiment of the present disclosure. The vehicle 10 includes a metal roof panel 2 covering an opening 10a in an upper portion of the vehicle 10, and a rear door panel 3 covering an opening 10b in a rear portion of the vehicle 10 such that the opening 10b can be opened or closed. The roof panel 2 can be replaced with another roof panel of a different type (a different material).

The opening 10a in the upper portion of the vehicle 10 and the opening 10b in the rear portion of the vehicle 10 are continuous (see FIG. 1B), and the roof panel 2 covering the opening 10a in the upper portion of the vehicle 10 and the rear door panel 3 covering the opening 10b in the rear portion of the vehicle 10 are arranged in parallel. In other words, a rear portion of the vehicle 10 located around the opening 10a in the upper portion of the vehicle 10 corresponds to a peripheral portion of the rear door panel 3 toward the front of the vehicle 10.

Figure 3:
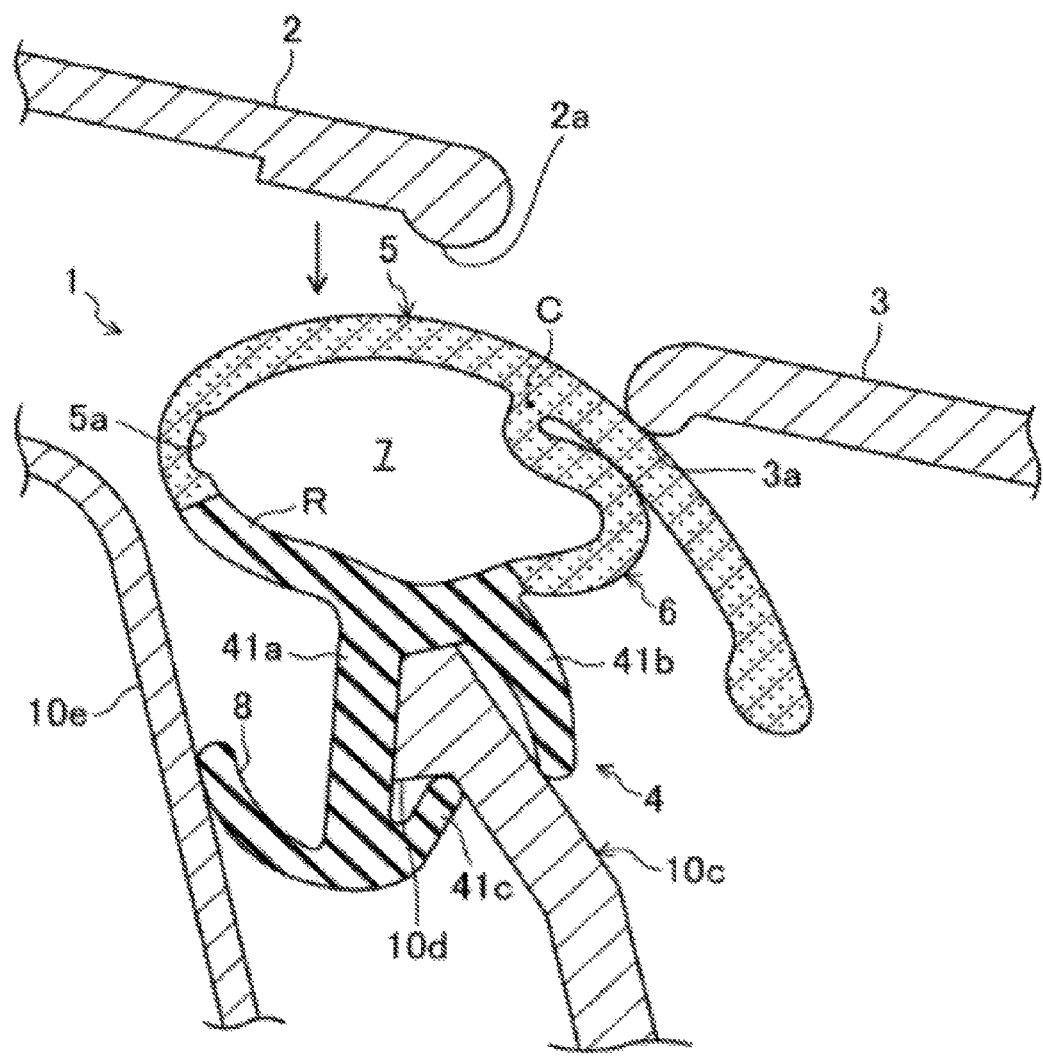
FIG. 3 is a view corresponding to a cross-sectional view taken along the line B-B in FIG. 1B, and illustrates a state of a portion of the vehicle immediately before a metal roof panel is attached to a vehicle body.
Figure 4:
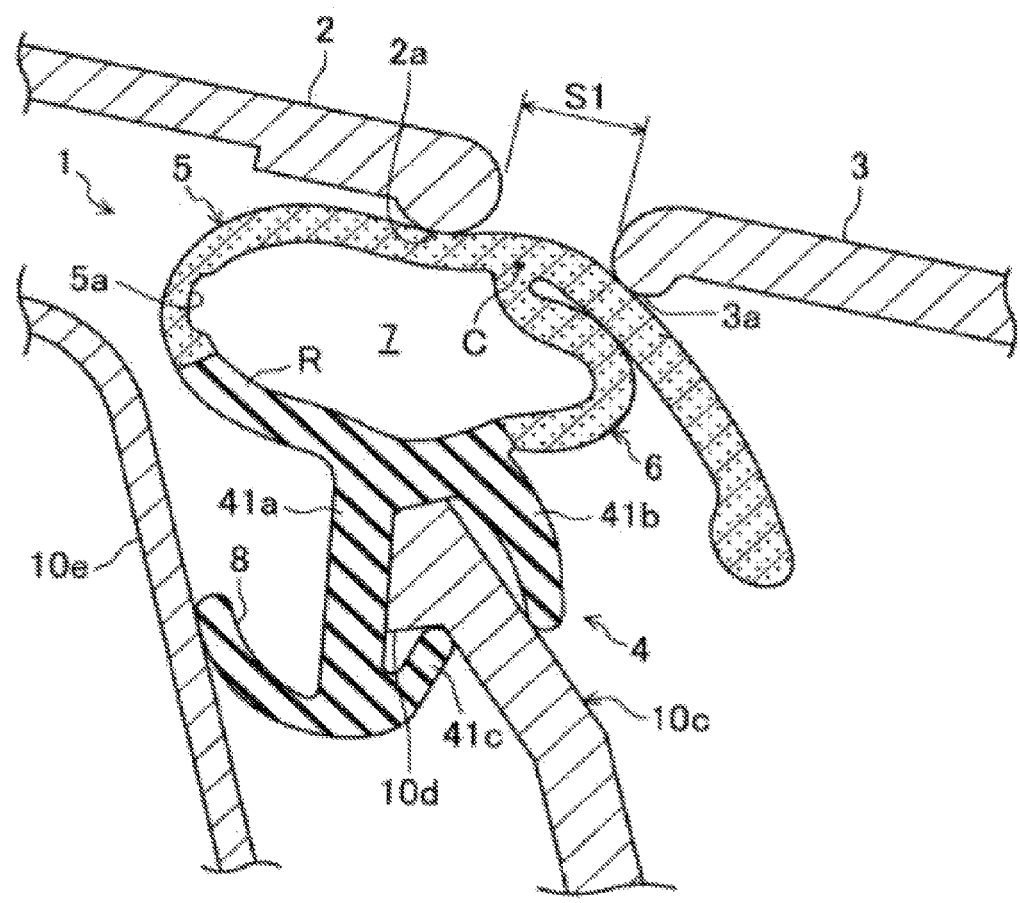
FIG. 4 is a view corresponding to a cross-sectional view taken along the line B-B in FIG. 1B, and illustrates a state of a portion of the vehicle immediately after the metal roof panel is attached to the vehicle body.

As illustrated in FIGS. 3 and 4, a retainer 10c (near a vehicle body) is provided inside a portion of a cabin corresponding to a clearance S1 between a peripheral portion of the roof panel 2 toward the rear of the vehicle 10 and a peripheral portion of the rear door panel 3 toward the front of the vehicle 10 to extend along the clearance S1 in the vehicle width direction. An upper end portion of the retainer 10c includes a nail portion 10d protruding toward the front of the vehicle 10.

A body frame 10e is provided below the roof panel 2 so as to be inclined downward toward the rear of the vehicle 10, is separated from the retainer 10c by a predetermined distance, and extends in the vehicle width direction.

A weatherstrip 1 according to the first embodiment of the present disclosure is attached to the upper end of the retainer 10c.

Figure 2:
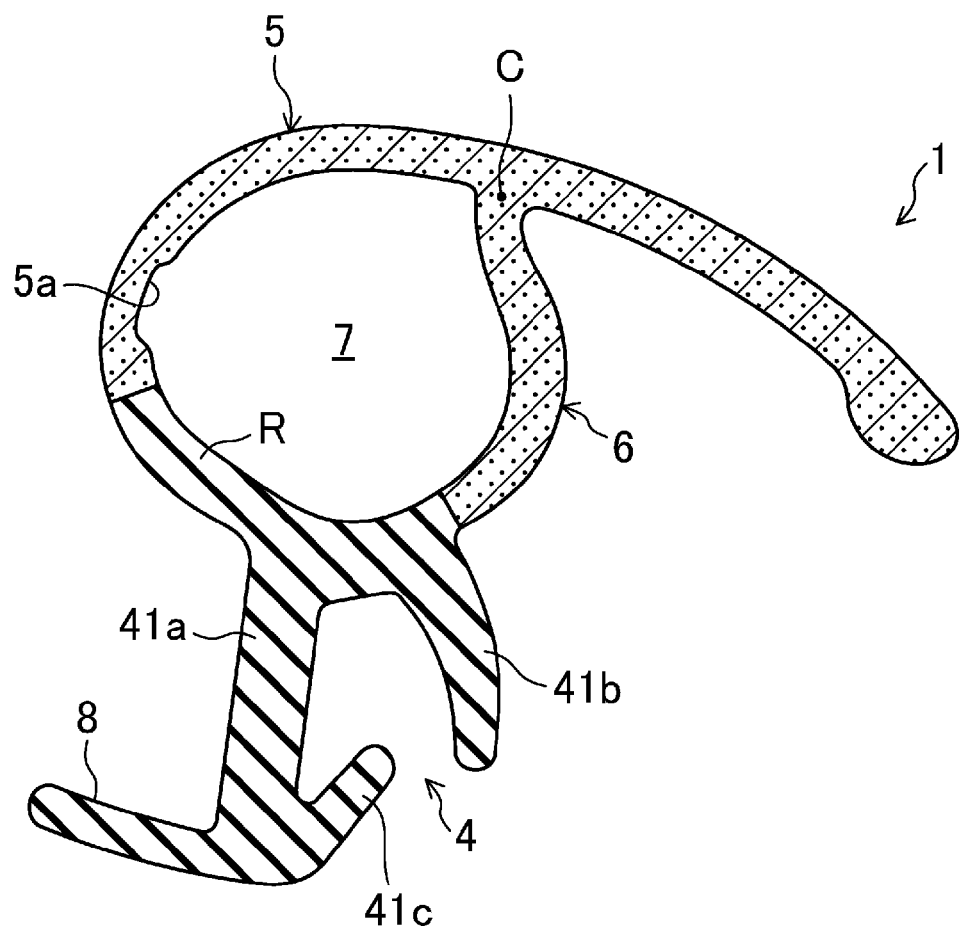
FIG. 2 is a cross-sectional view of the weatherstrip according to the first embodiment.

The weatherstrip 1 includes an attachment portion 4, a lip-like flexible seal wall 5, a flexible bridging wall 6, and a hollow portion 7. The attachment portion 4 is fitted to the retainer 10c. The seal wall 5 extends from an upper portion of the attachment portion 4 toward the front of the vehicle 10 (toward the interior of the cabin), is subsequently turned up, and extends toward the rear of the vehicle (toward the outside of the cabin). The seal wall 5 thus has a generally J-shaped cross section. The bridging wall 6 bridges a portion of the seal wall 5 corresponding to the clearance S1 (a portion C thereof in each of FIGS. 2-4) and the attachment portion 4 in a generally vertical direction. The hollow portion 7 is surrounded by the attachment portion 4, the seal wall 5, and the bridging wall 6.

The attachment portion 4 has a generally U-shaped cross-sectional shape that is open downward, and includes a front wall 41a located toward the front of the vehicle 10 and a rear wall 41b located toward the rear of the vehicle 10.

The attachment portion 4 is made of sponge rubber that has a specific gravity of greater than or equal to about 0.6 and equal to or less than about 1.3 and contains a plurality of air bubbles, or solid rubber that has a specific gravity of greater than or equal to about 0.6 and equal to or less than about 1.3 and does not contain air bubbles. The sponge rubber or the solid rubber is a rubber-like elastic material of, for example, ethylene-propylene-diene copolymer (EPDM).

A lower end portion of the front wall 41a includes a protrusion 41c protruding obliquely upward toward the rear of the vehicle 10. When the attachment portion 4 is fitted to the retainer 10c from above, the protrusion 41c is engaged with the nail portion 10d of the retainer 10c.

A portion of the lower end portion of the front wall 41a toward the front of the vehicle 10 (toward the interior of the cabin) includes a flexible lip portion 8. The lip portion 8 extends obliquely upward toward the front of the vehicle 10, and has a lower surface that contacts the body frame 10e with the attachment portion 4 fitted to the retainer 10c.

While a root portion R of the seal wall 5 connected to the attachment portion 4 is made of the same material as that of the attachment portion 4, a portion of the seal wall 5 except the root portion R is made of sponge rubber having a specific gravity of greater than or equal to about 0.4 and equal to or less than about 0.8 and containing a plurality of air bubbles. The sponge rubber is ethylene-propylene-diene copolymer (EPDM).

The attachment portion 4 and the root portion R of the seal wall 5 connected to the attachment portion 4 are made of the same material, are continuous, and are designed to provide greater rigidity than the portion of the seal wall 5 except the root portion R.

A portion of the seal wall 5 toward the front of the vehicle 10 (toward the interior of the cabin) is gently curved, and a recess 5a is formed in the inner surface (a surface toward the rear of the vehicle 10) of the portion of the seal wall 5 toward the front of the vehicle 10 to extend in the vehicle width direction.

A portion of the seal wall 5 from a middle portion thereof toward the rear end of the vehicle 10 is gently curved such that the middle portion is above the other portions of the seal wall 5. A portion of the seal wall 5 toward the rear end of the vehicle 10 is thicker than the other portion thereof.

The material of the bridging wall 6 is identical to that of the portion of the seal wall 5 except the root portion R, and the bridging wall 6 is gently curved such that a generally vertically central portion of the bridging wall 6 is located toward the rear of the vehicle 10 (outwardly of the cabin).

When the rear door panel 3 is closed in a situation where the attachment portion 4 has been attached to the retainer 10c and the roof panel 2 does not cover the opening 10a in the upper portion of the vehicle 10, a lower surface 3a of a peripheral portion of the rear door panel 3 toward the front of the vehicle 10 contacts a portion of the seal wall 5 closer to the rear of the vehicle 10 than a portion of the seal wall 5 connected to the bridging wall 6 (portion C) from above as illustrated in FIG. 3. Thus, the seal wall 5 and the bridging wall 6 are bent downwardly.

In this case, the bridging wall 6 is bent such that a generally vertically central portion of the bridging wall 6 protrudes outwardly of the cabin, and a region of the bridging wall 6 around the protruding end thereof contacts a lower surface of the seal wall 5.

When a change is made from the state in FIG. 3 to the state in which the roof panel 2 covers the opening 10a in the upper portion of the vehicle 10, a lower surface 2a of a peripheral portion of the roof panel 2 toward the rear of the vehicle 10 contacts a portion of the seal wall 5 closer to the front of the vehicle 10 than the portion C from above as illustrated in FIG. 4. The seal wall 5 is curved about a portion of the seal wall 5 corresponding to the recess 5a such that the middle portion of the seal wall 5 is bent downwardly. Since the lower surface 2a of the peripheral portion of the roof panel 2 and the lower surface 3a of the peripheral portion of the rear door panel 3 contacts the seal wall 5 from above, the clearance S1 is sealed.

Figure 5:
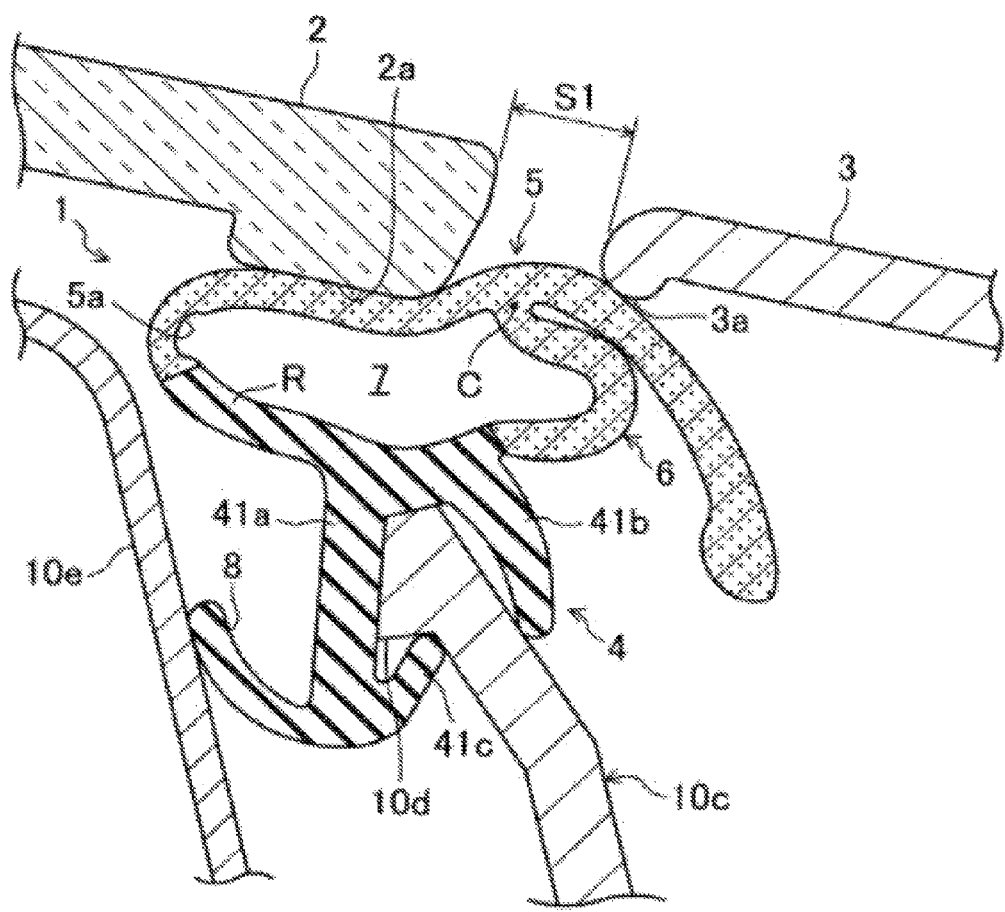
FIG. 5 is a view corresponding to FIG. 4 when a glass roof panel is used.

Here, the metal roof panel 2 covering the opening 10a in the upper portion of the vehicle 10 can be replaced with a glass roof panel 2 that is thicker than the metal roof panel 2. When the glass roof panel 2 covers the opening 10a in the upper portion of the vehicle 10, a lower surface 2a of a peripheral portion of the roof panel 2 toward the rear of the vehicle 10 is below the lower surface 3a of the peripheral portion of the rear door panel 3 toward the front of the vehicle 10 as illustrated in FIG. 5.

When the seal wall 5 of the weatherstrip 1 according to the first embodiment of the present disclosure is pressed from above, the seal wall 5 and the bridging wall 6 are bent downwardly. This allows the bridging wall 6 to apply an upward pressure to a portion of the seal wall 5 near the peripheral portion of the rear door panel 3. For this reason, when, in the same manner as in the case in which the metal roof panel 2 has been replaced with the thick glass roof panel 2 as described above, the lower surface 2a of the peripheral portion of the roof panel 2 is located below the lower surface 3a of the peripheral portion of the rear door panel 3, and a portion of the seal wall 5 near the peripheral portion of the roof panel 2 is pressed more downwardly than a portion of the seal wall 5 near the peripheral portion of the rear door panel 3, the upward pressure is applied from the bridging wall 6 to the portion of the seal wall 5 near the peripheral portion of the rear door panel 3 to allow the seal wall 5 to press against the lower surface 3a of the peripheral portion of the rear door panel 3. This can prevent a clearance from being formed between the lower surface 3a of the peripheral portion of the rear door panel 3 and the seal wall 5.

The root portion R of the seal wall 5 connected to the attachment portion 4 has greater rigidity than the portion of the seal wall 5 except the root portion R and the bridging wall 6, and is thus less likely to be bent. For this reason, when the seal wall 5 seals the clearance S1 between the peripheral portion of the roof panel 2 and the peripheral portion of the rear door panel 3, the phenomenon where the root portion R is bent downwardly of the seal wall 5 toward the interior of the cabin (the phenomenon called "inclination") is prevented even in a situation where the pressure acts on the seal wall 5 toward the interior of the cabin. This prevention prevents the seal wall 5 from being displaced from the location corresponding to the clearance S1 between the peripheral portion of the roof panel 2 and the peripheral portion of the rear door panel 3 toward the interior of the vehicle, and can ensure the sealing of the clearance S1.

Furthermore, since the root portion R and the attachment portion 4 are made of the same material, and are continuous, the root portion R is less likely to be bent toward the front of the vehicle 10 (toward the interior of the cabin) with respect to the attachment portion 4. This makes it more difficult for the seal wall 5 to be bent downward toward the front of the vehicle 10 even with the pressure applied to the seal wall 5 toward the front of the vehicle 10 (toward the interior of the cabin), can ensure that the seal wall 5 is prevented from being displaced from the location corresponding to the clearance S1 between the peripheral portion of the roof panel 2 and the peripheral portion of the rear door panel 3 toward the front of the vehicle 10 (toward the interior of the cabin), and can improve the sealing performance at which the clearance S1 is sealed.

In addition, a portion of the seal wall 5 including the recess 5a is thinner than the other portions thereof, and for this reason, when the pressure is applied to the seal wall 5 from above, this pressure ensures that the portion of the seal wall 5 including the recess 5a is bent. This makes it difficult for the shape of the bent seal wall 5 to change even with the changing of the roof panel 2 to another roof panel 2 of a different type, and can reduce variations in sealing performance at which the clearance S1 between the peripheral portion of the replaceable roof panel 2 of the vehicle 10 and the peripheral portion of the rear door panel 3 is sealed.

Figure 6:
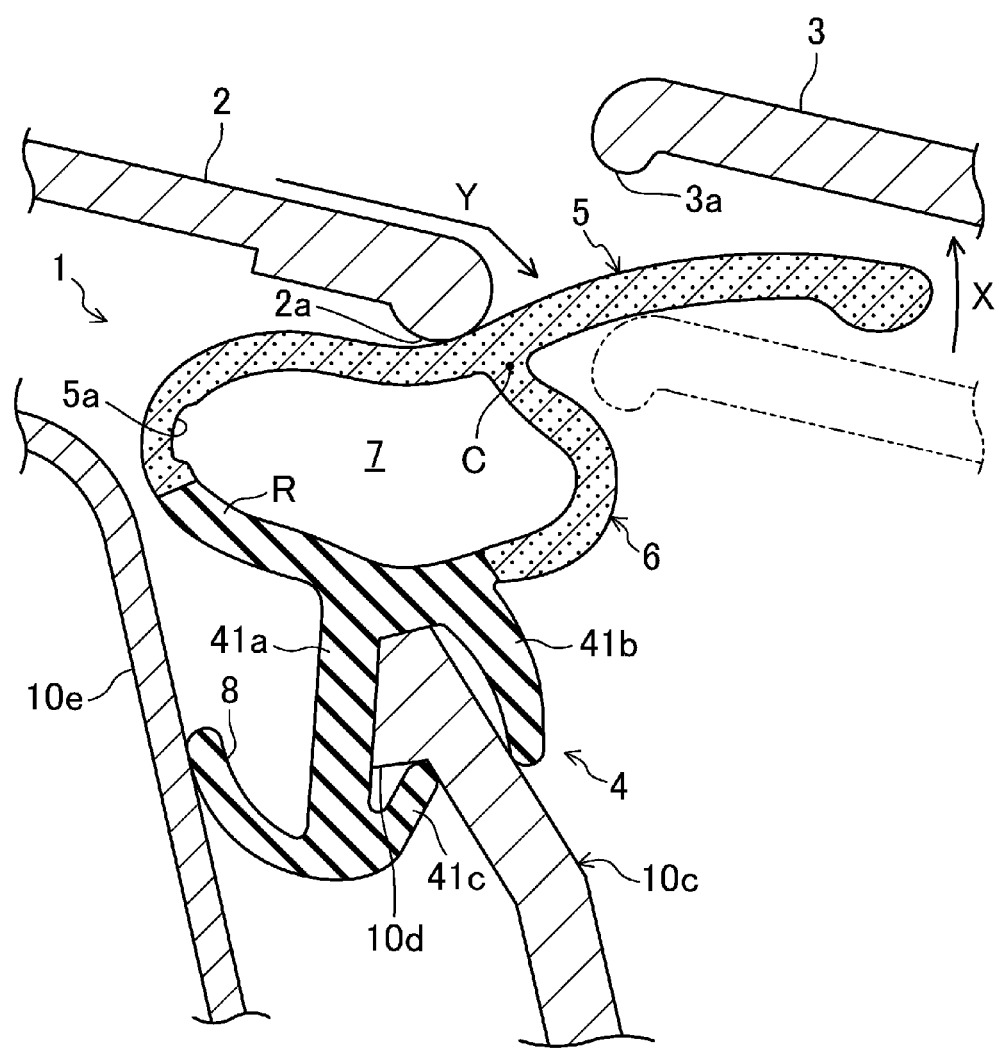
FIG. 6 is a view corresponding to a cross-sectional view taken along the line B-B in FIG. 1B, and illustrates a state in which a rear door panel is open with the metal roof panel attached to the vehicle body.
Figure 7:
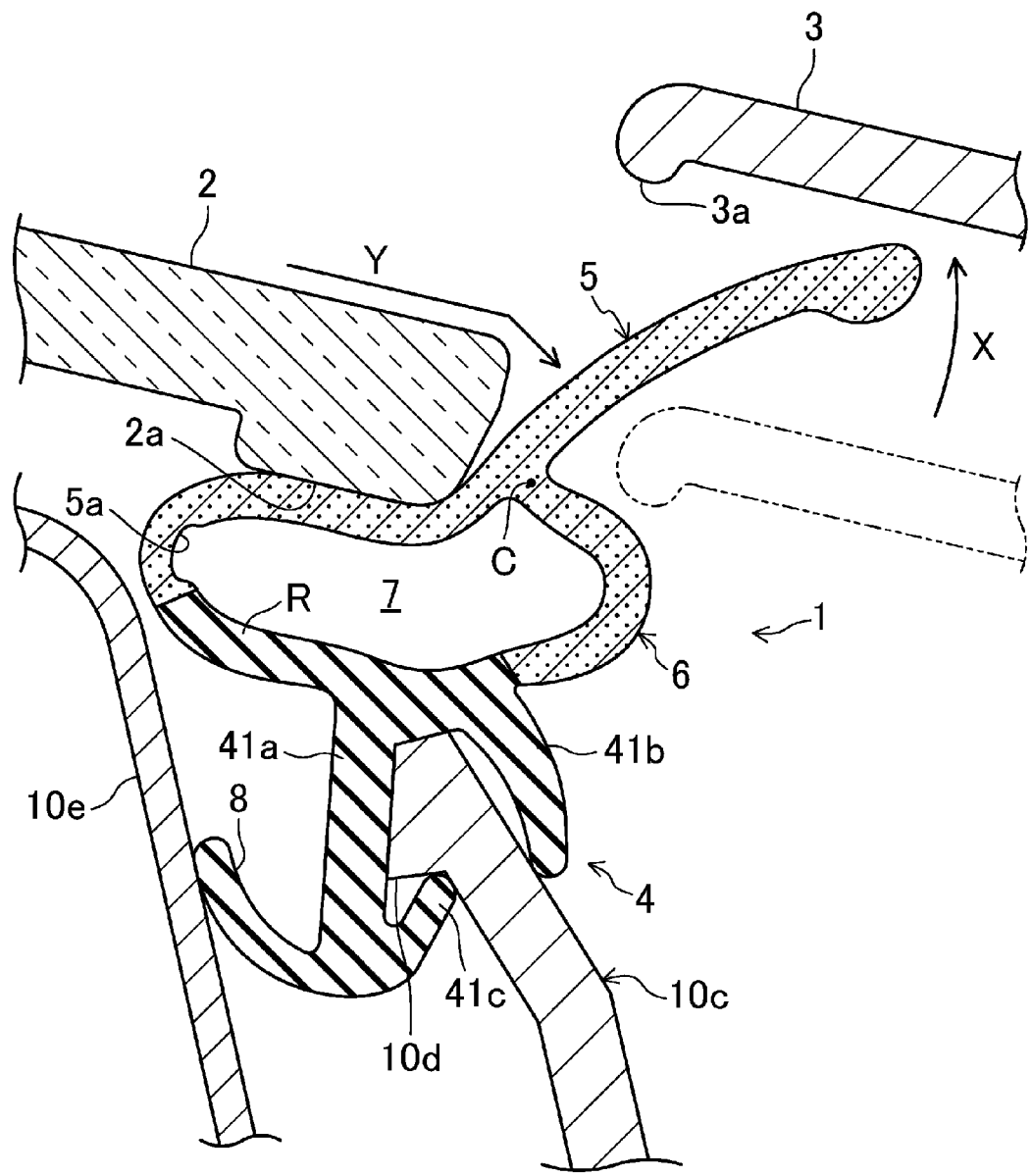
FIG. 7 is a view corresponding to FIG. 6 when a glass roof panel is used.

When the rear door panel 3 opens in the direction X (see FIGS. 6 and 7) from the state illustrated in each of FIGS. 4 and 5, the lower surface of the rear door panel 3 does not contact the seal wall 5 of the weatherstrip 1. Since the bridging wall 6, therefore, applies an upward pressure to a portion of the seal wall 5 near the rear door panel 3 as illustrated in FIGS. 6 and 7, this allows the portion of the seal wall 5 near the rear door panel 3 to be inclined such that with decreasing distance to the outer end of the seal wall 5, the height of the seal wall 5 increases. Thus, the inclined portion prevents water flowing through an upper surface of the roof panel 2 toward the rear of the vehicle 10 (the arrow Y in each of FIGS. 6 and 7) from moving backward of the inclined portion of the seal wall 5, and can ensure that water is prevented from entering the cabin through the opening 10b in the rear portion of the vehicle 10 when the rear door panel 3 is opened.

Second Embodiment of the Disclosure

Figure 8:
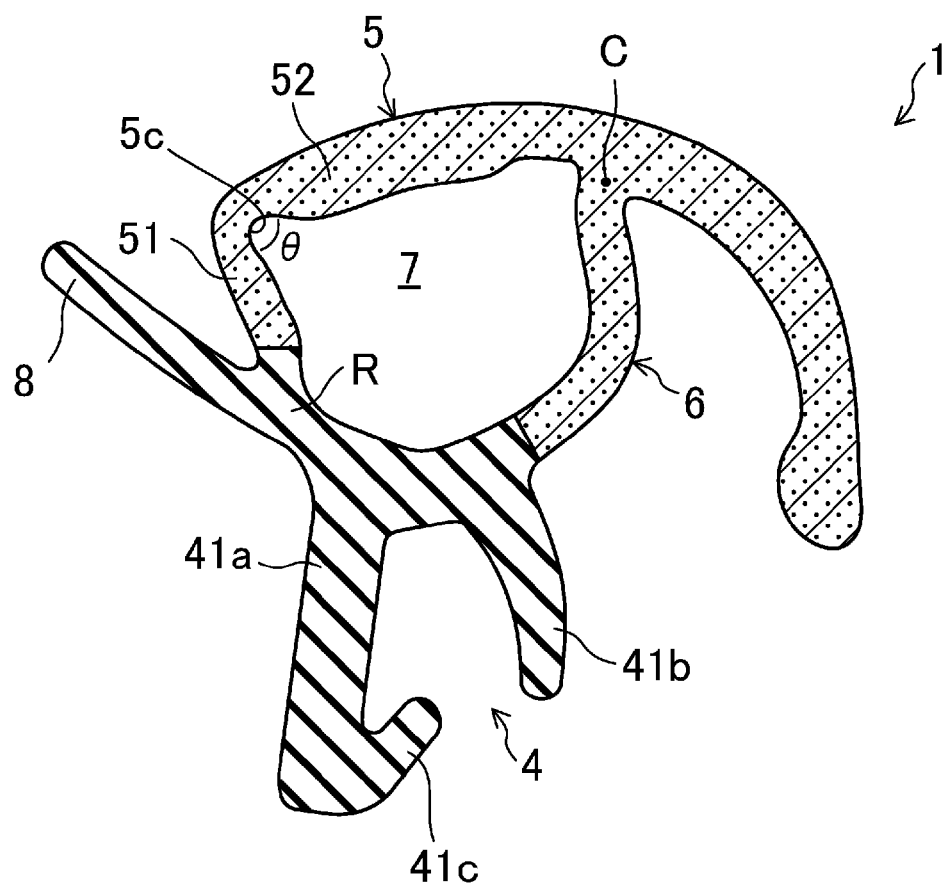
FIG. 8 is a view corresponding to FIG. 2 according to a second embodiment of the present disclosure.
Figure 9:
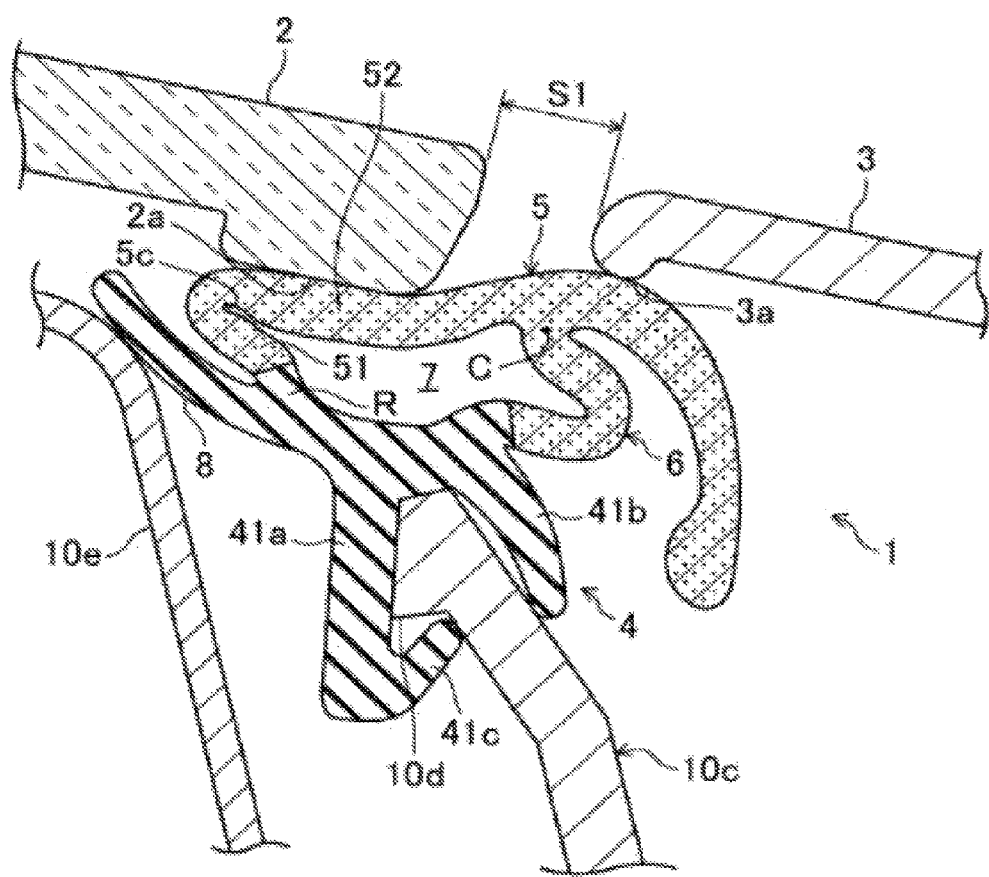
FIG. 9 is a view corresponding to FIG. 5 according to the second embodiment of the present disclosure.

FIGS. 8 and 9 illustrate a weatherstrip 1 according to a second embodiment of the present disclosure. In the second embodiment, the structure of a portion of a seal wall 5 and the location of a lip portion 8 are merely different from those of the first embodiment, and other elements are identical to those of the first embodiment. Thus, only the difference between the first and second embodiments will now be described.

Specifically, the seal wall 5 of the second embodiment includes a first wall portion 51 and a second wall portion 52. The first wall portion 51 extends obliquely upwardly from an upper portion of an attachment portion 4 near the front of a vehicle 10 toward the front of the vehicle 10 (toward the interior of the cabin). The second wall portion 52 extends from the extending end of the first wall portion 51 toward the rear of the vehicle 10 (outwardly of the cabin).

A recess 5c is formed in the inner surface of a portion of the seal wall 5 connecting the first wall portion 51 to the second wall portion 52. An acute angle θ (see FIG. 8) is formed between a surface of a portion of the recess 5c near the first wall portion 51 and a surface of a portion of the recess 5c near the second wall portion 52.

The lip portion 8 of the second embodiment is made of the same material as a root portion R of the seal wall 5 connected to the attachment portion 4, and extends obliquely upwardly from a surface of a generally vertically central portion of the root portion R near the front of the vehicle 10 toward the front of the vehicle 10 as illustrated in FIG. 8. A lower surface of the lip portion 8 contacts a body frame 10e as illustrated in FIG. 9. For this reason, when a peripheral portion of a roof panel 2 and a peripheral portion of a rear door panel 3 press the seal wall 5 from above, the lip portion 8 supports the seal wall 5 from the interior of the cabin even with the pressure applied to the seal wall 5 toward the front of the vehicle 10 (toward the interior of the cabin). This makes it difficult for the seal wall 5 to be bent toward the front of the vehicle 10. Thus, when the seal wall 5 seals the clearance S1 between the peripheral portion of the roof panel 2 and the peripheral portion of the rear door panel 3, the seal wall 5 is not bent downwardly toward the front of the vehicle 10, and the clearance S1 can continue being sealed at high sealing performance.

When the peripheral portion of the roof panel 2 and the peripheral portion of the rear door panel 3 press the seal wall 5 from above, this pressure ensures that a portion of the seal wall 5 connecting the first and second wall portions 51 and 52 (a portion thereof corresponding to the recess 5c) is bent. This makes it difficult for the shape of the bent seal wall 5 to vary even with the changing of the roof panel 2 to another roof panel 2 of a different type similarly to the first embodiment, and can reduce variations in sealing performance at which the clearance S1 between the peripheral portion of the replaceable roof panel 2 of the vehicle 10 and the peripheral portion of the rear door panel 3 is sealed.

Third Embodiment of the Disclosure

FIGS. 10-14 illustrate a weatherstrip 1 according to a third embodiment of the present disclosure. In the third embodiment, the structure of a portion of a seal wall 5, the location of a bridging wall 6, the location of a lip portion 8, and the structure of a portion of a rear door panel 3 are merely different from those of the first embodiment, and other elements are identical to those of the first embodiment. Thus, only the difference between the first and third embodiments will now be described.

Specifically, the seal wall 5 of the third embodiment is semielliptic, and its middle portion is located above the other portions of the seal wall 5. A root portion R of the seal wall 5 connected to an attachment portion 4 extends generally horizontally in the longitudinal direction of a vehicle.

A portion of the seal wall 5 closer to the rear door panel 3 than a portion C' of the seal wall 5 is thicker than a portion of the seal wall 5 closer to a roof panel 2 than the portion C'.

A recess 5b is formed in the inner surface (a surface toward the rear of the vehicle) of a portion of the seal wall 5 toward the front of the vehicle (toward the interior of the cabin) to extend in the vehicle width direction.

Figure 11:
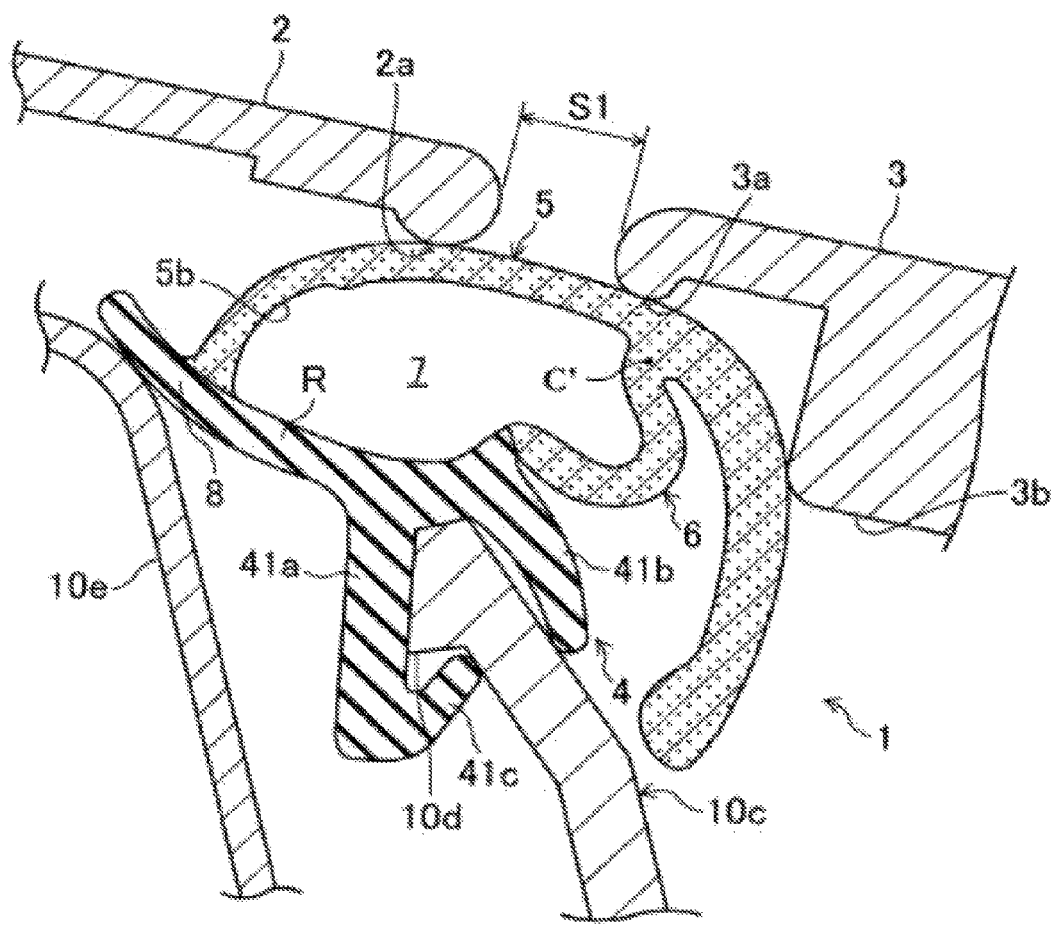
FIG. 11 is a view corresponding to FIG. 4 according to the third embodiment of the present disclosure.
Figure 12:
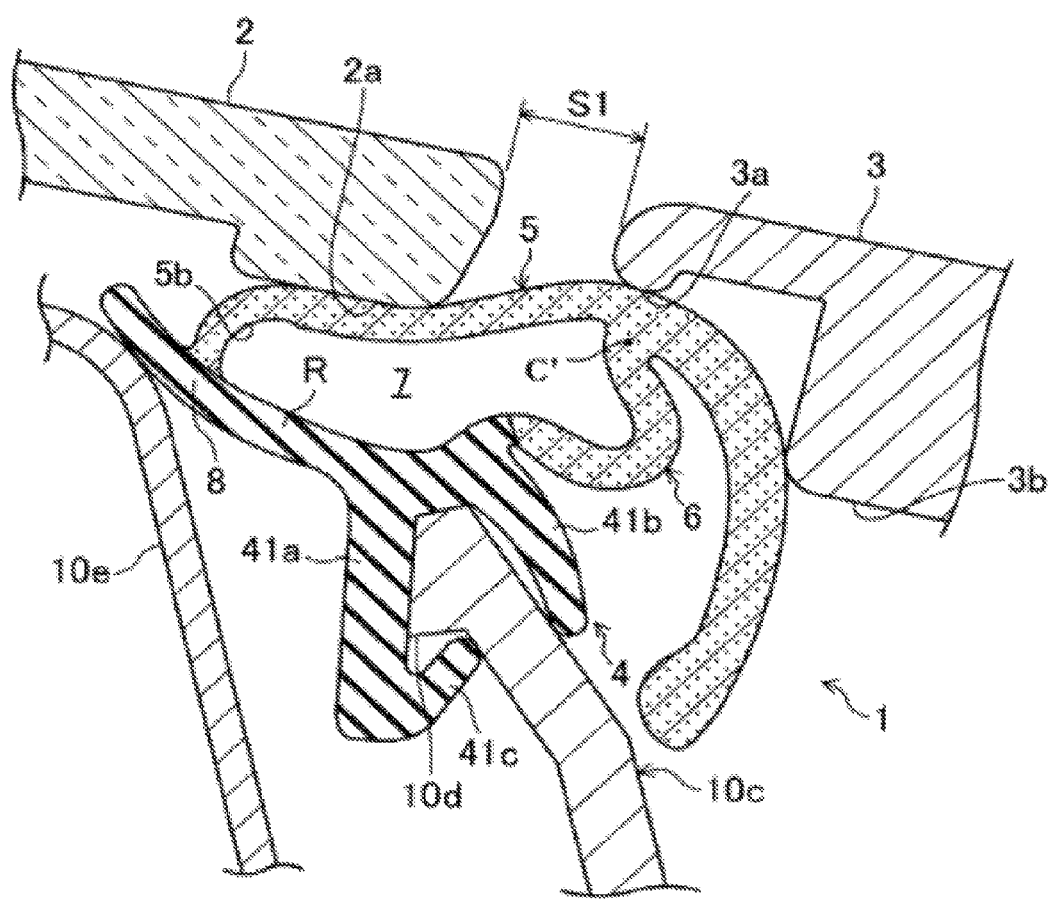
FIG. 12 is a view corresponding to FIG. 5 according to the third embodiment of the present disclosure.
Figure 13:
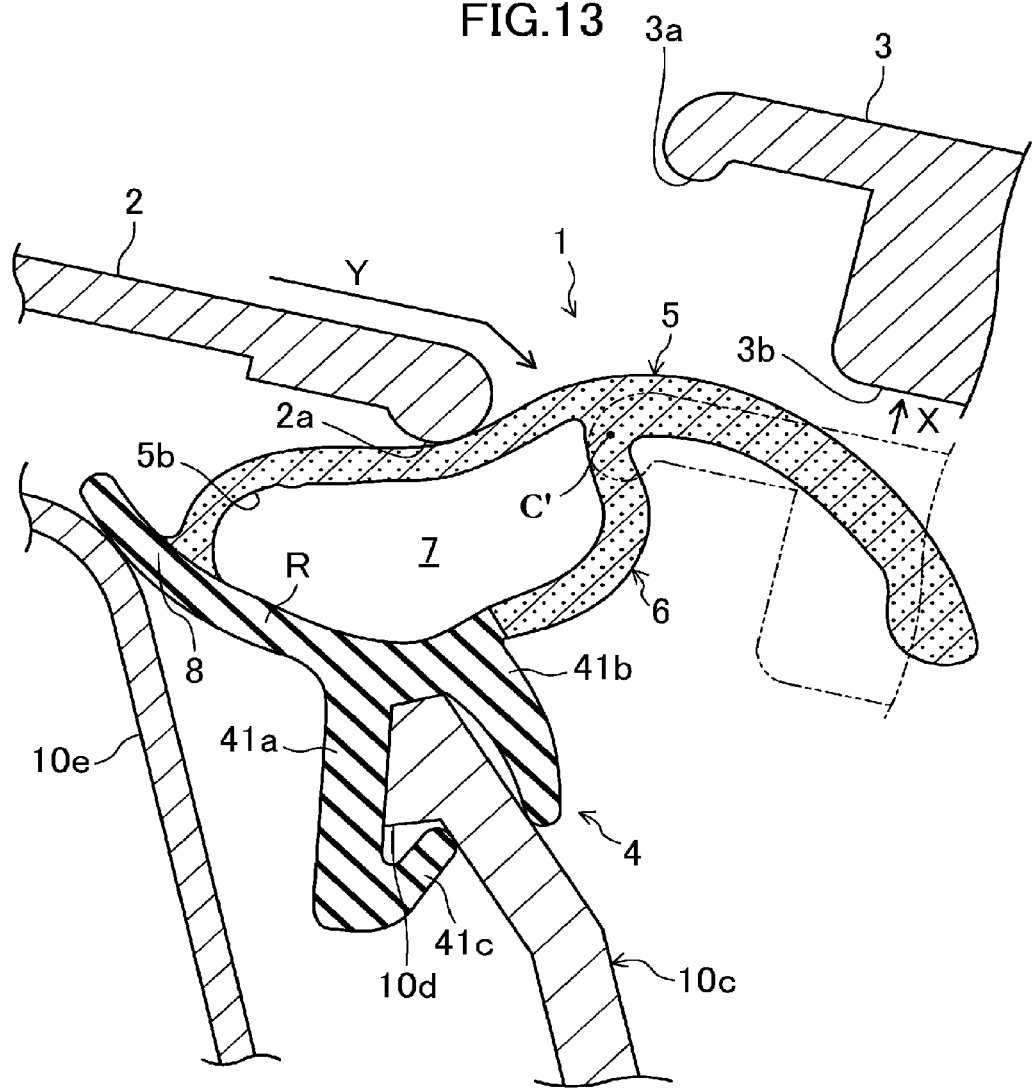
FIG. 13 is a view corresponding to FIG. 6 according to the third embodiment of the present disclosure.
Figure 14:
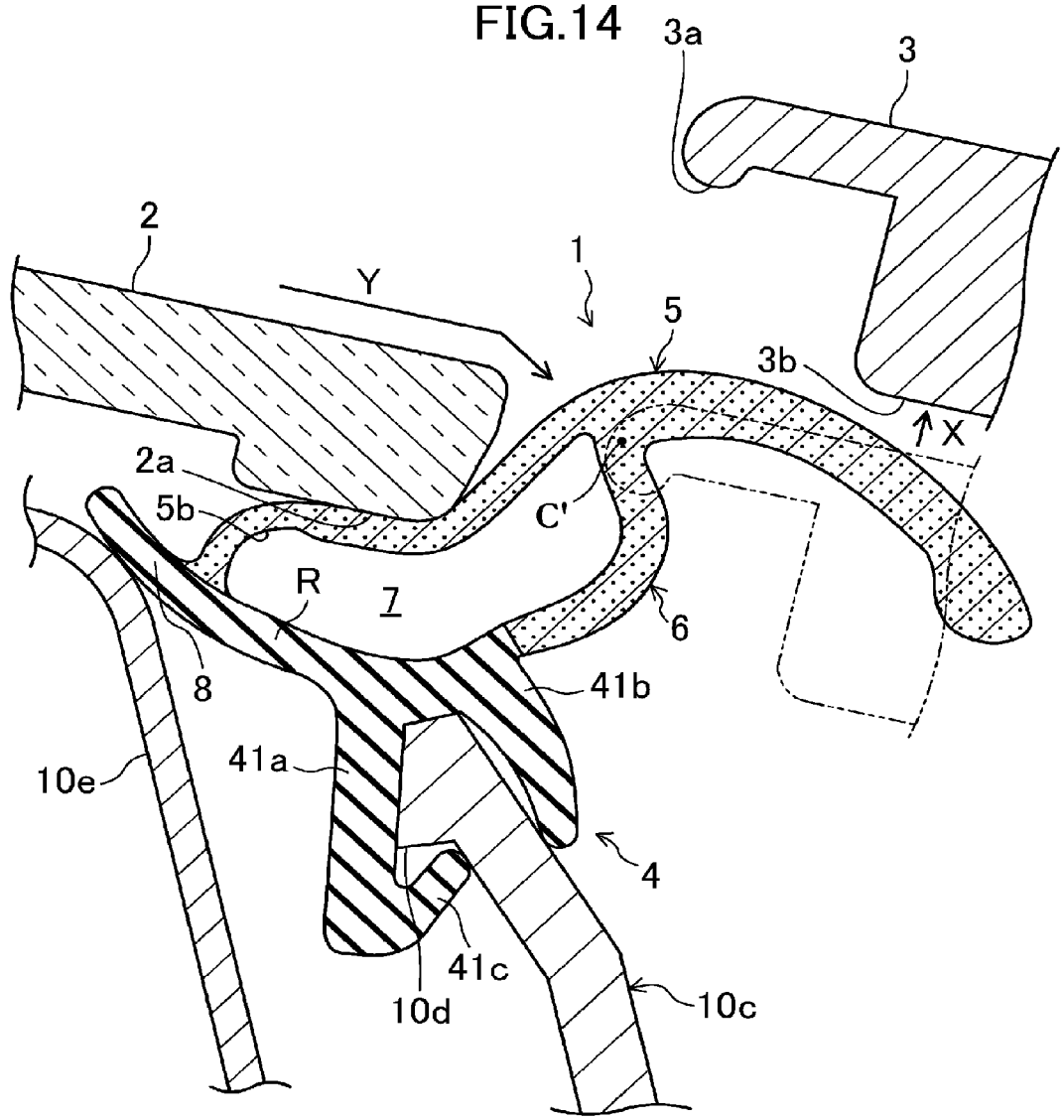
FIG. 14 is a view corresponding to FIG. 7 according to the third embodiment of the present disclosure.

A bridging wall 6 of the third embodiment is connected to a portion of the seal wall 5 corresponding to a peripheral portion of the rear door panel 3 (the portion C' in each of FIGS. 11 and 12).

Figure 10:
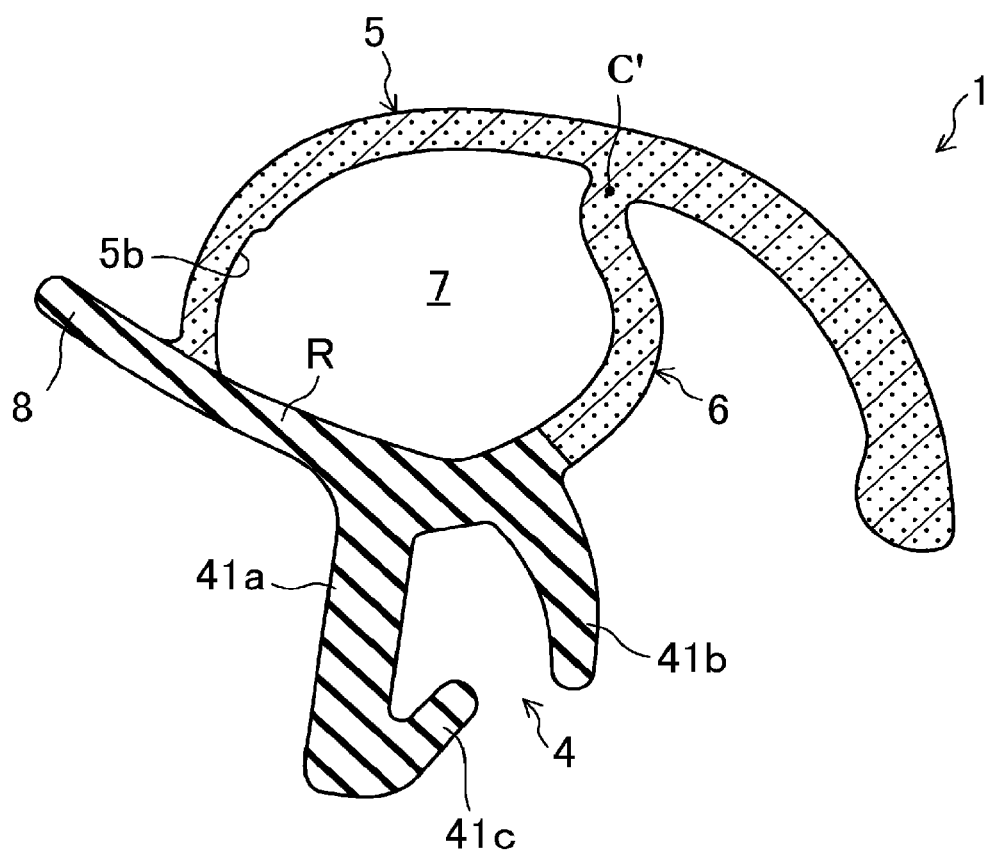
FIG. 10 is a view corresponding to FIG. 2 according to a third embodiment of the present disclosure.

The lip portion 8 of the third embodiment protrudes obliquely upwardly from an end of the root portion R of the seal wall 5 connected to the attachment portion 4 near the front of a vehicle toward the front of the vehicle along the root portion R as illustrated in FIG. 10. A lower surface of the lip portion 8 contacts a body frame 10e as illustrated in FIGS. 11-14.

A portion of the rear door panel 3 of the third embodiment closer to the rear of the vehicle than a peripheral portion of the rear door panel 3 toward the front of the vehicle has a lower surface 3b protruding downwardly so as to be located below a lower surface 3a of the peripheral portion of the rear door panel 3 toward the front of the vehicle as illustrated in FIGS. 11 and 12. The lower surface 3b presses the seal wall 5 from above such that while the rear door panel 3 covers an opening 10b in an rear portion of the vehicle, a portion of the seal wall 5 closer to the rear door panel 3 than the portion C' is suspended.

When the rear door panel 3 is opened from the state illustrated in each of FIGS. 11 and 12, the lower surfaces of the rear door panel 3 does not contact the seal wall 5 of the weatherstrip 1. Since the bridging wall 6, therefore, applies an upward pressure to a portion of the seal wall 5 near the rear door panel 3 similarly to the first embodiment, this allows a portion of the seal wall 5 near the rear door panel 3 to have a portion that is inclined such that with decreasing distance to the outer end of the seal wall 5, the height of the seal wall 5 increases. This can ensure that water is prevented from entering the cabin through the opening 10b in the rear portion of the vehicle when the rear door panel 3 is opened.

Furthermore, in the third embodiment of the present disclosure, a portion of the seal wall 5 connected to the bridging wall 6 (the portion C') is located to correspond to the lower surface 3a of the peripheral portion of the rear door panel 3. Similarly to the first and second embodiments, when the seal wall 5 is pressed from above, the seal wall 5 and the bridging wall 6 are bent downwardly, thereby allowing the bridging wall 6 to apply an upward pressure to a portion of the seal wall 5 near the peripheral portion of the rear door panel 3. This can prevent a clearance from being formed between the lower surface 3a of the peripheral portion of the rear door panel 3 and the weatherstrip 1.

While the weatherstrip 1 of each of the first and second embodiments of the present disclosure is used to seal the clearance S1 between the roof panel 2 and the rear door panel 3, it can be used also to seal a clearance S1 between a peripheral portion of a rear door panel 3 of a vehicle including the rear door panel 3 that is arranged in parallel with a roof panel 2 and a portion of the vehicle around an opening 10a in an upper portion of the vehicle.

While, in each of the first and second embodiments of the present disclosure, the material of the weatherstrip 1 is EPDM, the material of the weatherstrip 1 is not limited to EPDM. The weatherstrip 1 may be made of any other rubber material or any other elastic material, such as isoprene rubber (IR), chloroprene rubber (CR), a thermoplastic elastomer (an olefinic or styrenic thermoplastic elastomer), or soft polyvinyl chloride.

Furthermore, while, in each of the first and second embodiments of the present disclosure, the seal wall 5 is made of sponge rubber containing a plurality of air bubbles, the material of the seal wall 5 is not limited to the sponge rubber. The seal wall 5 may be made of, for example, solid rubber that does not contain air bubbles.

The present disclosure is suitable for a weatherstrip sealing the clearance between a peripheral portion of a roof panel covering an opening in an upper portion of a vehicle and a portion of the vehicle around the opening in the upper portion of the vehicle.

What is claimed is:

1. A weatherstrip sealing a clearance between a peripheral portion of a replaceable roof panel covering an opening in an upper portion of a vehicle and a portion of the vehicle around the opening in the upper portion of the vehicle, the weatherstrip comprising:
   an attachment portion attached to a vehicle body;
   a lip-like flexible seal wall having a generally J-shaped cross section, extending from an upper portion of the attachment portion toward an interior of a cabin, then turned up, and extending outwardly of the cabin, a lower surface of the peripheral portion of the roof panel and a lower surface of the portion of the vehicle around the opening in the upper portion of the vehicle contacting the lip-like flexible seal wall from above;
   a flexible bridging wall bridging the attachment portion and a portion of the seal wall corresponding to the clearance or the portion of the vehicle around the opening in the upper portion of the vehicle; and
   a hollow portion surrounded by the attachment portion, the seal wall, and the bridging wall,
   wherein a root portion of the seal wall connected to the attachment portion includes a flexible lip portion extending toward the interior of the cabin and having a lower surface contacting the vehicle body from above.

2. The weatherstrip of claim 1, wherein
   an inner surface of a portion of the seal wall toward the interior of the cabin has a recess.

3. The weatherstrip of claim 1, wherein
   the portion of the vehicle around the opening in the upper portion of the vehicle is a peripheral portion of a rear door panel toward a front of the vehicle, and
   the rear door panel covers an opening in a rear portion of the vehicle such that the opening can be opened or closed.

4. The weatherstrip of claim 1, wherein
   a root portion of the seal wall connected to the attachment portion is made of a material having greater rigidity than the bridging wall and a portion of the seal wall except the root portion.

5. The weatherstrip of claim 4, wherein
the root portion and the attachment portion are made of an identical material, and are continuous.

\* \* \* \* \*